US010800467B2

(12) United States Patent
Yokota et al.

(10) Patent No.: US 10,800,467 B2
(45) Date of Patent: Oct. 13, 2020

(54) DOOR HANDLE

(71) Applicant: TOYOTA JIDOSHA KABUSHIKI KAISHA, Toyota-shi, Aichi (JP)

(72) Inventors: Yuichi Yokota, Toyota (JP); Akihide Fukuyama, Toyota (JP); Shigeru Sato, Toyota (JP); Koshi Yamada, Odawara (JP); Hajime Ichikawa, Okazaki (JP); Yoshihiro Fujiura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 156 days.

(21) Appl. No.: 16/199,949

(22) Filed: Nov. 26, 2018

(65) Prior Publication Data

US 2019/0225284 A1     Jul. 25, 2019

(30) Foreign Application Priority Data

Jan. 25, 2018 (JP) ................................ 2018-010585

(51) Int. Cl.
*B62D 35/00* (2006.01)
*E05B 85/16* (2014.01)

(52) U.S. Cl.
CPC ............ *B62D 35/008* (2013.01); *E05B 85/16* (2013.01)

(58) Field of Classification Search
CPC ............................. B62D 35/008; E05B 85/16
USPC ....................................................... 296/180.5
See application file for complete search history.

(56) References Cited

U.S. PATENT DOCUMENTS

2013/0119703 A1   5/2013   Fujii et al.
2017/0246986 A1   8/2017   Imai et al.

FOREIGN PATENT DOCUMENTS

JP   2015-083459 A   4/2015
JP   2017-150274 A   8/2017

*Primary Examiner* — Pinel E Roman
(74) *Attorney, Agent, or Firm* — Oliff PLC

(57) ABSTRACT

A door handle that has an elongated shape and is mounted onto a vehicle door in a state where a longitudinal direction thereof is aligned with a vehicle front-and-rear direction, the door handle includes: a front part and a rear part each of which has a connection surface to be connected to the vehicle door; and a grip part provided between the front part and the rear part, wherein a rear end of the front part protrudes outward in the longitudinal direction more than the front end thereof on the connection surface of the front part, and a curvature radius of a protruding portion of the rear end of the front part on the connection surface of the front part is R4 or less.

9 Claims, 16 Drawing Sheets

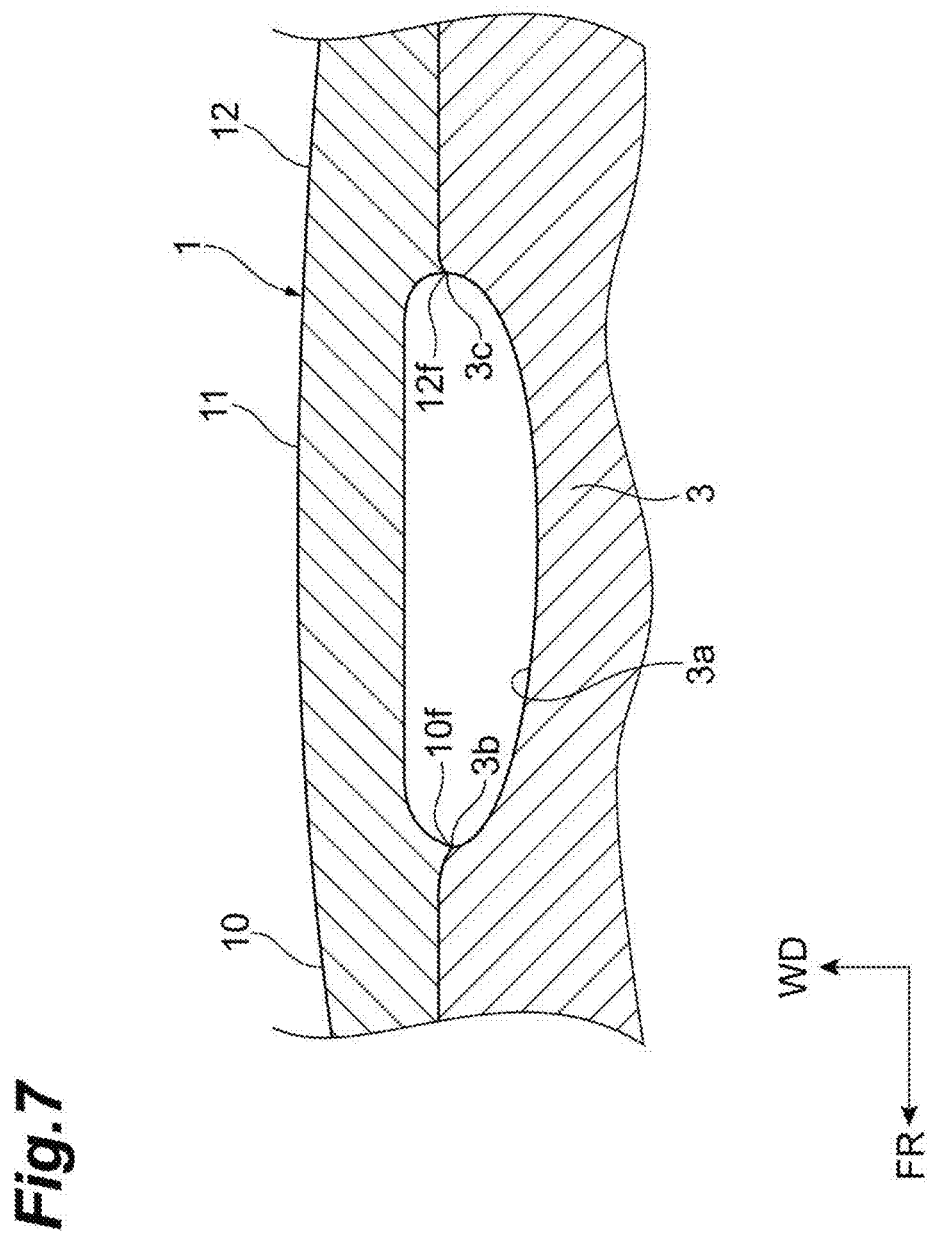

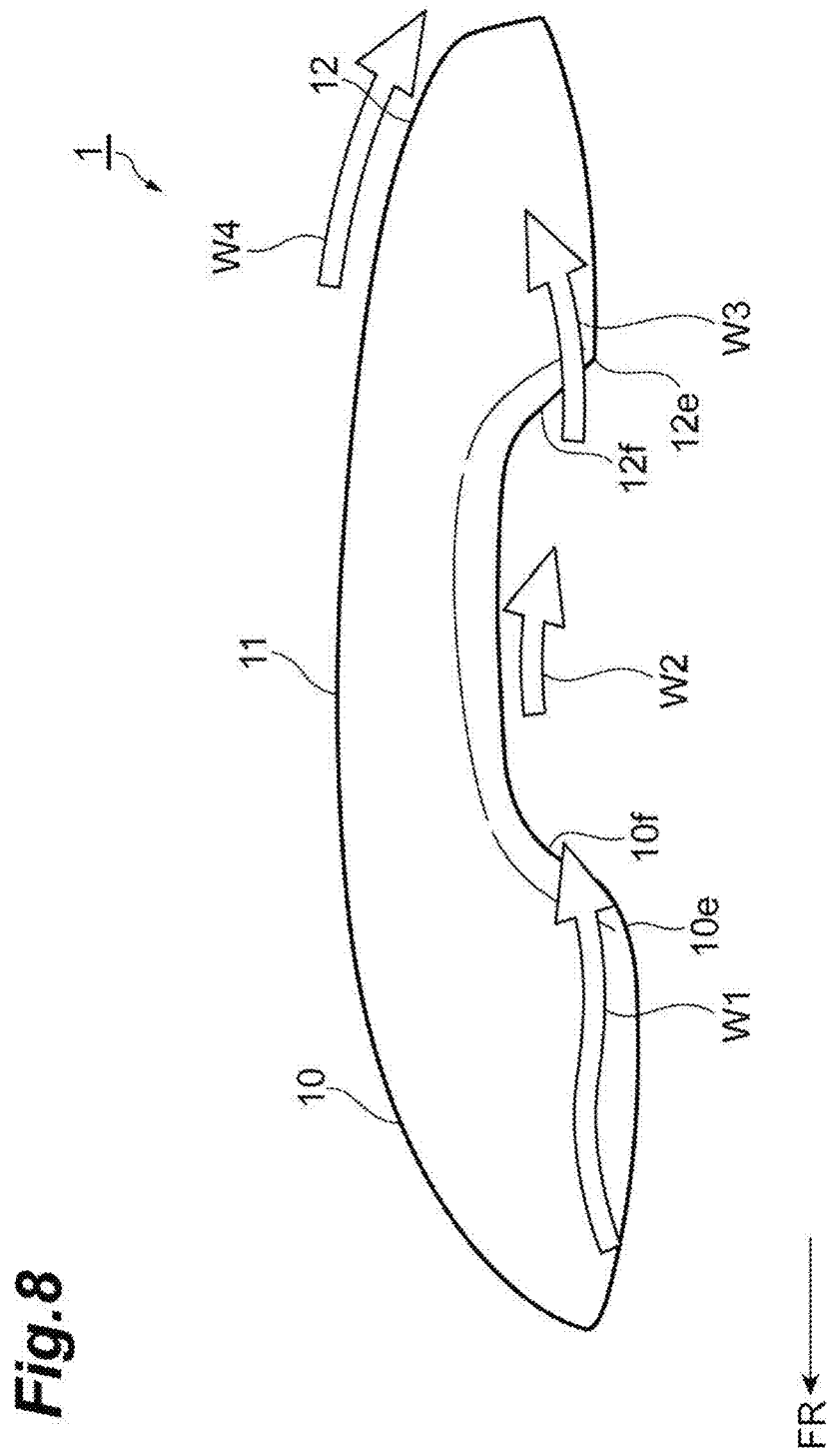

Fig.11A

| BODY SHAPE | SHAPE A | SHAPE B | SHAPE C | SHAPE D |
|---|---|---|---|---|
| EFFECT VERIFICATION RESULT | REFERENCE | SAME AS REFERENCE | SAME AS REFERENCE | SAME AS REFERENCE |

Fig.11B

| CONDITION | CONDITION A | CONDITION B | CONDITION C | CONDITION D | CONDITION E |
|---|---|---|---|---|---|
| HANDLE SHAPE | COMPARATIVE EXAMPLE | EXAMPLE | EXAMPLE | EXAMPLE | EXAMPLE |
| PRESENCE OR ABSENCE OF RECESSED PORTION OF DOOR | ABSENCE | ABSENCE | PRESENCE | PRESENCE | PRESENCE |
| HANDLE MOUNTING POSITION | REFERENCE POSITION | REFERENCE POSITION | POSITION 5 CM LOWER THAN MOUNTING POSITION IN VEHICLE UP-AND-DOWN DIRECTION | POSITION 5 CM HIGHER THAN MOUNTING POSITION IN VEHICLE UP-AND-DOWN DIRECTION | REFERENCE POSITION |
| EFFECT VERIFICATION RESULT | REFERENCE | GOOD | GOOD | GOOD | EXCELLENT |

*Fig.12A*

| θB | 40° | 60° | 80° | 90° | 100° |
|---|---|---|---|---|---|
| EFFECT VERIFICATION RESULT | SAME AS COMPARATIVE EXAMPLE | GOOD | GOOD | EXCELLENT | SAME AS COMPARATIVE EXAMPLE |

*Fig.12B*

| θC | 40° | 60° | 80° | 90° | 100° |
|---|---|---|---|---|---|
| EFFECT VERIFICATION RESULT | EXCELLENT | GOOD | GOOD | GOOD | SAME AS COMPARATIVE EXAMPLE |

Fig. 13

| θD | θE | EFFECT VERIFICATION RESULT |
|---|---|---|
| 45° | 45° | SAME AS COMPARATIVE EXAMPLE |
| 45° | 60° | SLIGHTLY GOOD |
| 45° | 75° | GOOD |
| 45° | 90° | GOOD |
| 60° | 60° | SLIGHTLY GOOD |
| 60° | 75° | GOOD |
| 60° | 90° | GOOD |
| 75° | 45° | SLIGHTLY GOOD |
| 75° | 60° | SLIGHTLY GOOD |
| 75° | 75° | GOOD |
| 75° | 90° | GOOD |
| 90° | 45° | SLIGHTLY GOOD |
| 90° | 60° | SLIGHTLY GOOD |
| 90° | 75° | EXCELLENT |
| 90° | 90° | EXCELLENT |

Fig. 14

| θF | 50° | 60° | 70° | 80° | 90° | 100° | 110° | 120° | 130° | 140° | 150° | 160° | 170° | 180° |
|---|---|---|---|---|---|---|---|---|---|---|---|---|---|---|
| EFFECT VERIFICATION RESULT | SAME AS COMPARATIVE EXAMPLE | SLIGHTLY GOOD | SLIGHTLY EXCELLENT | EXCELLENT | EXCELLENT | SLIGHTLY EXCELLENT | SLIGHTLY EXCELLENT | GOOD | GOOD | SLIGHTLY GOOD | SLIGHTLY GOOD | SLIGHTLY GOOD | SAME AS COMPARATIVE EXAMPLE | SAME AS COMPARATIVE EXAMPLE |

Fig.16A

| MOUNTING CONDITION | MOUNTING CONDITION A | MOUNTING CONDITION B | MOUNTING CONDITION C | MOUNTING CONDITION D | MOUNTING CONDITION E |
|---|---|---|---|---|---|
| EFFECT VERIFICATION RESULT | SLIGHTLY BAD | SAME AS COMPARATIVE EXAMPLE | EXCELLENT | GOOD | SAME AS COMPARATIVE EXAMPLE |

Fig.16B

| CURVATURE RADIUS | R0 | R1 | R2 | R3 | R4 | R5 |
|---|---|---|---|---|---|---|
| EFFECT VERIFICATION RESULT | EXCELLENT | EXCELLENT | EXCELLENT | GOOD | GOOD | SAME AS COMPARATIVE EXAMPLE |

Fig.16C

| CURVATURE RADIUS | R0 | R4 | R5 | R15 | R20 | R25 |
|---|---|---|---|---|---|---|
| EFFECT VERIFICATION RESULT | SAME AS COMPARATIVE EXAMPLE | SLIGHTLY GOOD | SLIGHTLY EXCELLENT | GOOD | SLIGHTLY EXCELLENT | EXCELLENT |

DOOR HANDLE

CROSS-REFERENCE TO RELATED APPLICATION

This application is based on Japanese Patent Application No. 2018-010585 filed with Japan Patent Office on Jan. 25, 2018, the entire contents of which are hereby incorporated by reference.

TECHNICAL FIELD

The disclosure relates to a door handle.

BACKGROUND

A door handle for a vehicle is disclosed in Japanese Unexamined Patent Publication No. 2017-150274. The door handle has an elongated shape, and is mounted onto a vehicle door in a state where a longitudinal direction thereof is aligned with a vehicle front-and-rear direction. The door handle has a front part and a rear part, which are to be connected to the vehicle door, and a grip part provided between the front part and the rear part.

SUMMARY

In the door handle disclosed in Japanese Unexamined Patent Publication No. 2017-150274, an air flow enters an inside of the grip part during traveling and a turbulent flow occurs in some cases. There is a possibility that the turbulent flow has an effect on the stability of a car body. A door handle that can improve the stability of a car body is desired in this technical field.

According to an aspect of the disclosure, there is provided a door handle that has an elongated shape and is mounted onto a vehicle door in a state where a longitudinal direction thereof is aligned with a vehicle front-and-rear direction. The door handle includes a front part and a rear part, each of which has a connection surface to be connected to the vehicle door, and a grip part provided between the front part and the rear part. A rear end of the front part protrudes in a width direction of the door handle more than a front end of the front part along the connection surface of the front part. A curvature radius of a protruding portion of the rear end of the front part on the connection surface of the front part is R4 or less.

A turbulent flow occurs by an air flow, that has entered the inside of the grip part, stagnating. When the curvature radius of the protruding portion of the rear end of the front part of the door handle is R4 or less, an air flow occurred along an outer surface of the front part is separated by the protruding portion. Therefore, the air flow is unlikely to enter the inside of the grip part. For this reason, the door handle can prevent the occurrence of a turbulent flow. Consequently, the door handle can improve the stability of the car body.

According to one embodiment, the rear end of the front part may form an inner surface of the grip part, and a rising angle of the rear end of the front part forming the inner surface of the grip part may be 60° or more. When the rising angle of the rear end of the front part is 60° or more, an air flow occurred along the outer surface of the front part is separated by the rear end of the front part. Therefore, the air flow is unlikely to enter the inside of the grip part. For this reason, the door handle can prevent the occurrence of a turbulent flow.

According to one embodiment, a front end of the rear part may protrude in a width direction of the door handle more than a rear end thereof along the connection surface of the rear part, and a curvature radius of a protruding portion of the front end of the rear part on the connection surface of the rear part may be R5 or more. When the curvature radius of the protruding portion of the front end of the rear part is R5 or more, an air flow that has entered the inside of the grip part is likely to flow to the rear of the grip part instead of being separated by the protruding portion. For this reason, the door handle can prevent the occurrence of a turbulent flow.

According to one embodiment, a front end of the rear part may form an inner surface of the grip part, and a rising angle of the front end of the rear part forming the inner surface of the grip part may be 90° or less. When the rising angle of the front end of the rear part is 90° or less, an air flow that has entered the inside of the grip part is likely to flow to the rear of the grip part instead of being separated by the front end of the rear part. For this reason, the door handle can prevent the occurrence of a turbulent flow. Since a separation point of an air flow flowing to the other side (an upper side and a lower side in the vehicle up-and-down direction) of the rear part can be caused to match a separation point of an air flow flowing above the rear part (outside in a vehicle width direction) at the rear of the rear part, the door handle can prevent the occurrence of wrapping of an air flow.

According to one embodiment, the front part may be connected to the vehicle door such that a position of the rear end thereof matches a position of a front end of a recessed portion, which opposes the grip part and is provided in a surface of the vehicle door, in the vehicle front-and-rear direction, and the rear part may be connected to the vehicle door such that a position of a front end thereof matches a position of a rear end of the recessed portion in the vehicle front-and-rear direction. In this case, since a wall surface resistance of an air flow reduces, the flow speed of the air flow along a car body surface can be increased.

According to one embodiment, the front part may be connected to the vehicle door such that a distance between the position of the rear end thereof and the position of the front end of the recessed portion is within 4 mm in a vehicle up-and-down direction, and the rear part may be connected to the vehicle door such that the position of the front end thereof is within 4 mm of the position of the rear end of the recessed portion in the vehicle up-and-down direction. In this case, since a wall surface resistance of an air flow reduces, the flow speed of the air flow along a car body surface can be increased.

According to one embodiment, a rear end of the rear part may be narrowed in a width direction more than a front end of the rear part along the connection surface of the rear part, and the rear end may have a severed shape. At least one of an opening angle formed between a direction along a narrowed external shape of the rear part and a direction along an external shape of the rear end of the rear part on the connection surface of the rear part and a rising angle of the rear end of the rear part may be 60° or more. In this case, an air flow along the outer surface of the car body at the rear of the grip part can be prevented from being separated. For this reason, the door handle can prevent the occurrence of a turbulent flow.

According to one embodiment, a first inclined portion that is formed in the front part and has a width in a vehicle width direction, which increases from the front part to the rear part, a second inclined portion that is formed at a rear of the first inclined portion in the vehicle front-and-rear direction and has a width in the vehicle width direction, which decreases from the front part to the rear part, a third inclined portion that has a width in the vehicle up-and-down direction, which decreases from the front part to the rear part, and a ridge connected the front part to the rear part may be further included. An inflection portion which has a steeply rising shape with respect to a vehicle side surface in plan view of a vehicle may be set in the rear part. In this case, an air flow in the vicinity of the door handle is rectified and a flow speed thereof increases. As a result, a main flow (the fastest flow of air flows) of the door handle approaches the vehicle door, and an air flow is prevented from being separated away from the vehicle door. For this reason, the door handle can prevent the occurrence of a turbulent flow.

According to one embodiment, an angle of the ridge may be 60° or more and 160° or less. In this case, an air flow in the vicinity of the door handle is further rectified. For this reason, the door handle can further prevent the occurrence of a turbulent flow.

According to the disclosure, the door handle that can improve the stability of the car body is provided.

BRIEF DESCRIPTION OF THE DRAWINGS

FIG. 7 is a schematic view illustrating a relationship between the door handle and a door of a vehicle.

FIG. 8 is a schematic view illustrating a flow of an air flow in a vicinity of the door handle.

FIG. 11A shows results of verifying a relationship between a body shape and an effect of the door handle.

FIG. 11B shows results of verifying a relationship between a shape and mounting condition of the door handle and an effect of the door handle.

FIG. 12A shows results of verifying a relationship between a front inner surface angle θB and the effect of the door handle.

FIG. 12B shows results of verifying a relationship between a rear inner surface angle ° C. and the effect of the door handle.

FIG. 13 shows results of verifying a relationship between a rear outer surface angle θD and an opening angle θE and the effect of the door handle.

FIG. 14 shows results of verifying a relationship between a setting angle θF and the effect of the door handle.

FIG. 16A shows results of verifying a relationship between a mounting condition and the effect of the door handle.

FIG. 16B shows results of verifying a relationship between a curvature radius of a rear end of a front part and the effect of the door handle.

FIG. 16C shows results of verifying a relationship between a curvature radius of a front end of the rear part and the effect of the door handle.

DETAILED DESCRIPTION

Hereinafter, an exemplary embodiment will be described with reference to the drawings. In the following description, the same or equivalent elements will be assigned with the same reference signs, and overlapping description will not be repeated.

(Outline of Door Handle)

Figure 1:
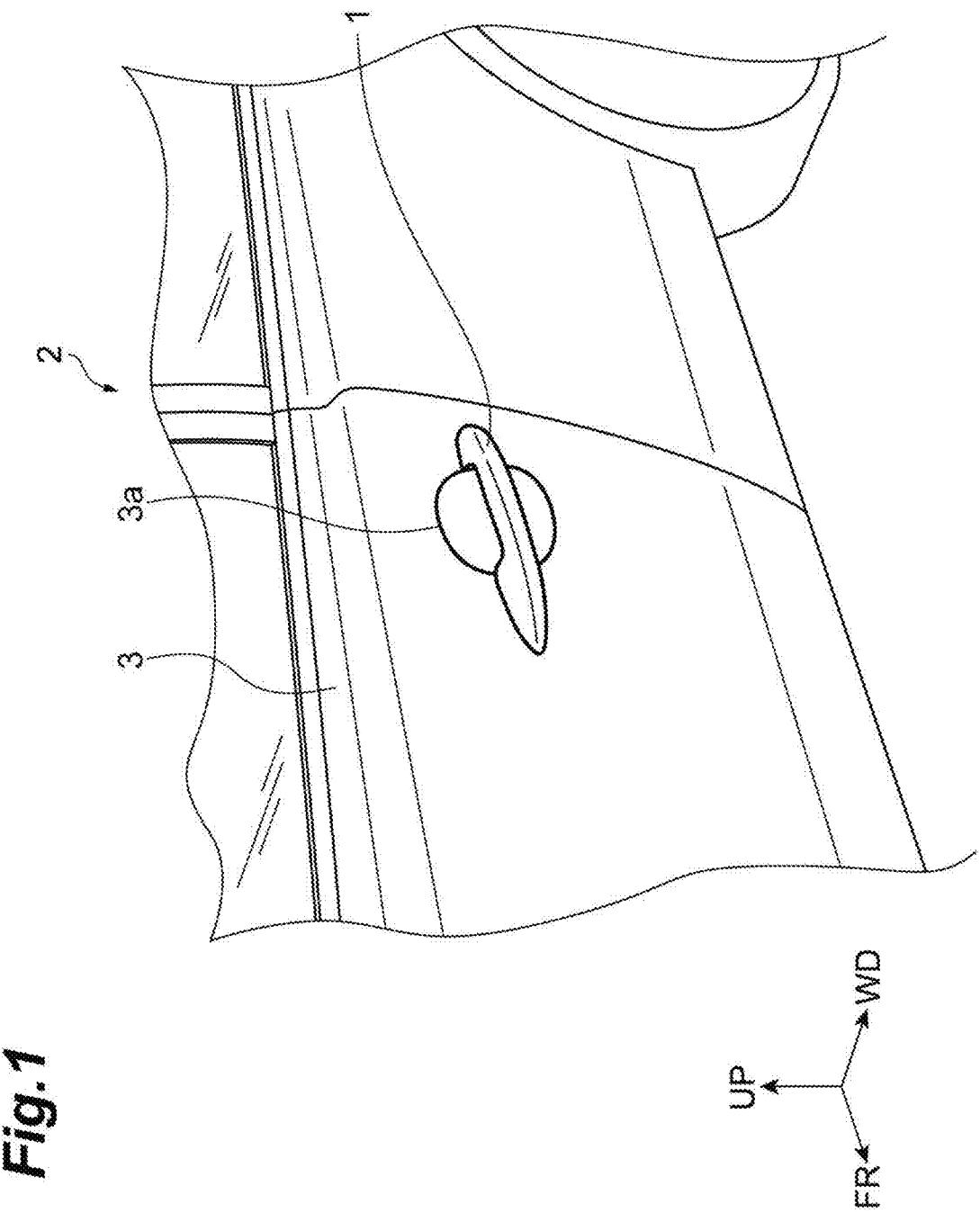
FIG. 1 is a view illustrating an example of a mounting position of a door handle according to the embodiment.

FIG. 1 is a view illustrating an example of a mounting position of a door handle 1 according to the embodiment. In FIG. 1, a front side of a vehicle front-and-rear direction is indicated with "FR", an outside of a vehicle width direction (right-and-left direction) is indicated with "WD", and an upper side of a vehicle up-and-down direction is indicated with "UP". As illustrated in FIG. 1, the door handle 1 is mounted onto a vehicle door 3 of a vehicle 2. The door handle 1 has an elongated shape, and is mounted onto the vehicle door 3 in a state where a longitudinal direction thereof is aligned with the vehicle front-and-rear direction. For example, the door handle 1 is mounted onto the vehicle door 3 such that a central axis extending in the longitudinal direction is parallel to an air flow flowing along the vehicle door 3. For example, the door handle 1 is to be provided so as to oppose a recessed portion 3a provided in the vehicle door 3. The door handle 1 has a shape that allows the door handle to rectify an air flow in the vicinity thereof, to increase the flow speed of the air flow, and to prevent the occurrence of a turbulent flow.

Figure 2:
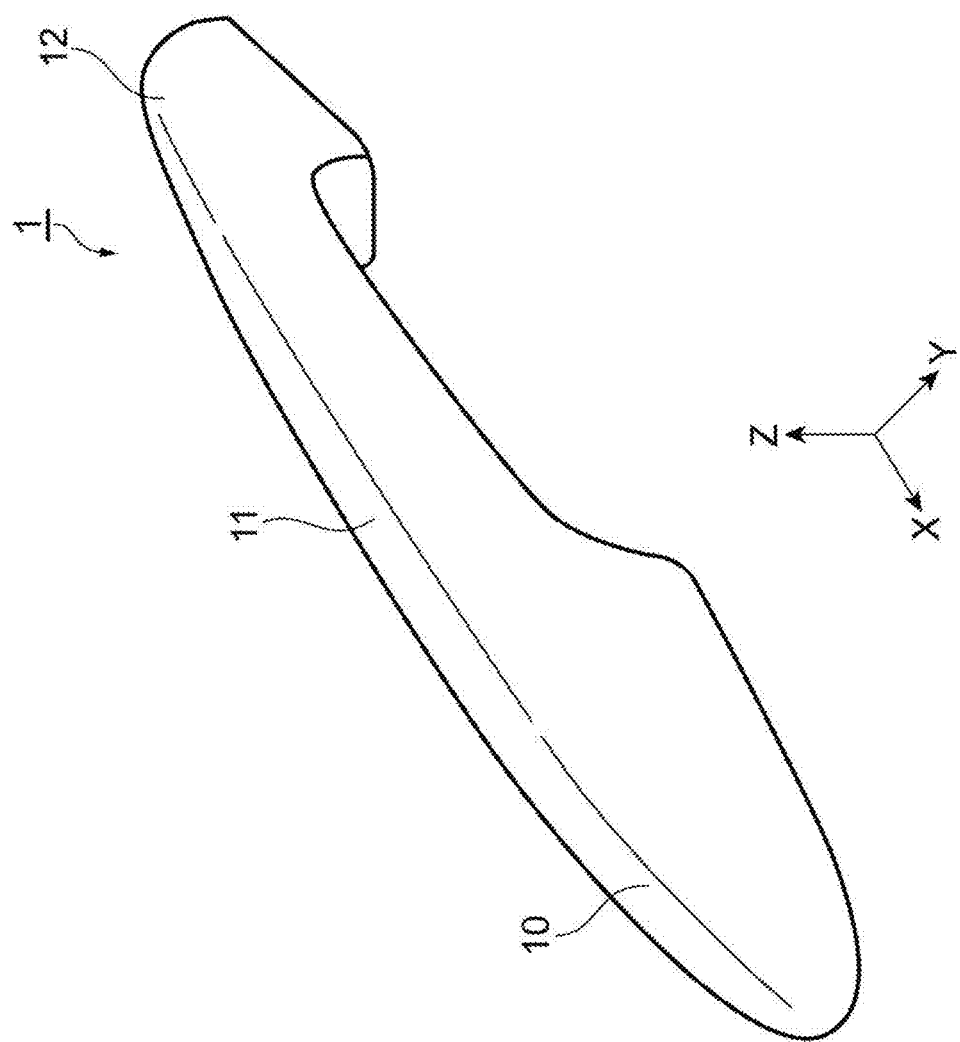
FIG. 2 is a perspective view of an example of the door handle.

FIG. 2 is a perspective view of an example of the door handle. In the following drawings, the longitudinal direction of the door handle 1 will be set as an X-axis direction, a width direction of the door handle 1 will be set as a Y-axis direction, and a height direction of the door handle 1 will be set as a Z-axis direction. The X-axis direction matches the vehicle front-and-rear direction of FIG. 1, the Y-axis direction matches the vehicle up-and-down direction of FIG. 1, and the Z-axis direction matches the vehicle width direction of FIG. 1. The door handle 1 is smoothly formed from a front end to a rear end in the longitudinal direction.

The door handle 1 has a front part 10 and a rear part 12, which are to be connected to the vehicle door 3, and a grip part 11 provided between the front part 10 and the rear part 12. The grip part 11 is a portion to be gripped by a passenger in order to open and close the vehicle door 3, and is to be supported by the vehicle door 3 by means of the front part 10 and the rear part 12 such that a cavity is formed between the grip part and the vehicle door 3. The shape of the door handle 1 may be an airfoil fin shape having an airfoil thickness in the width direction thereof (Y-axis direction).

(Detailed Structure of Door Handle)

Figure 3A:
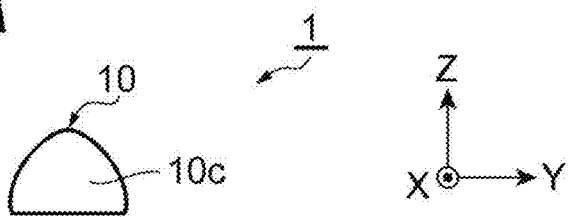
FIG. 3A is a front view of an example of the door handle.
Figure 3B:
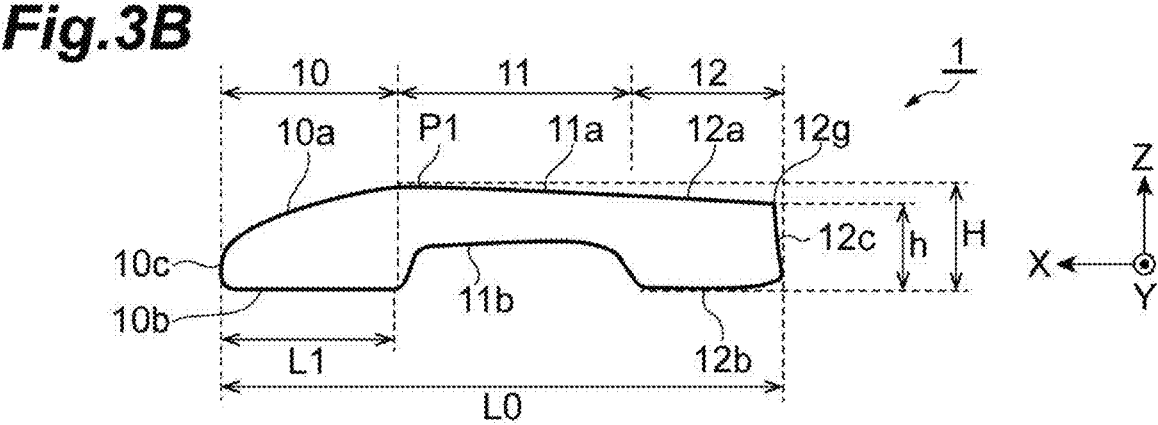
FIG. 3B is a side view of an example of the door handle.
Figure 3C:
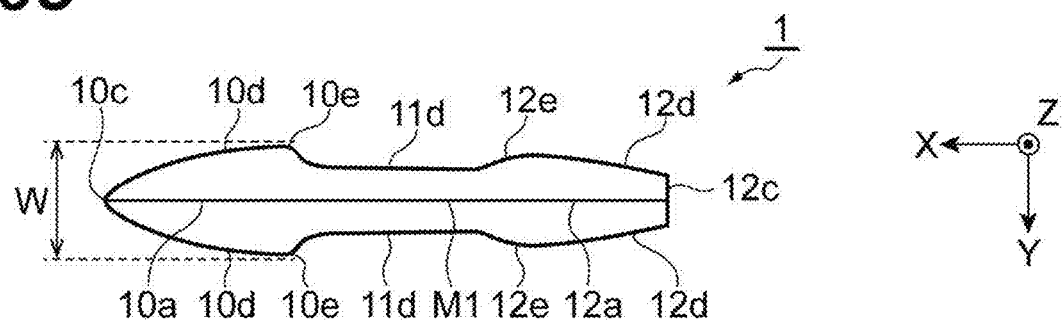
FIG. 3C is a top view of an example of the door handle.
Figure 3D:
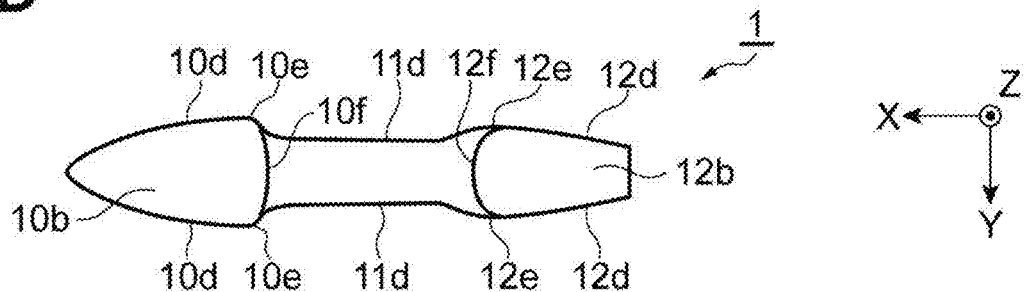
FIG. 3D is a back view of an example of the door handle.
Figure 3E:
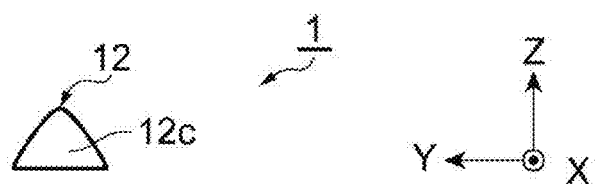
FIG. 3E is a rear view of an example of the door handle.

FIG. 3A is a front view of an example of the door handle. FIG. 3B is a side view of an example of the door handle. FIG. 3C is a top view of an example of the door handle. FIG. 3D is a back view of an example of the door handle. FIG. 3E is a rear view of an example of the door handle.

As illustrated in FIGS. 3A to 3E, the door handle 1 is symmetrical with respect to an axis in the width direction thereof (Y-axis direction). The front part 10 of the door handle 1 has, on a back surface thereof, a connection surface 10b to the vehicle door 3. The rear part 12 of the door handle 1 has, on a back surface thereof, a connection surface 12b to the vehicle door 3. The door handle 1 is to be connected to the vehicle door 3 via the connection surfaces 10b and 12b with the axis thereof aligned with the vehicle front-and-rear direction.

The height of the door handle 1 (Z-axis direction) gradually increases from a front end 10c of the front part 10 to the rear of the front part 10. Hereinafter, an inclination, which is formed in the front part 10, in the height direction will be referred to as a first inclined portion 10a. When the door handle 1 is connected to the vehicle door 3, the first inclined portion 10a becomes an inclined portion having a width in the vehicle width direction, which increases from the front part 10 to the rear part 12. The first inclined portion 10a smoothly guides an air flow so as to be directed along the door handle 1. The first inclined portion 10a may be formed in a straight line, or may be formed in a curved line.

The height of the door handle 1 (Z-axis direction) is a maximum height H at a position P1 on the grip part 11 (or position P1 in a boundary region between the front part 10 and the grip part 11), and gradually decreases from the position P1 to the rear. Hereinafter, an inclination, which is formed at the rear of the first inclined portion 10a in the longitudinal direction (the rear in the vehicle front-and-rear direction), in the height direction will be referred to as a second inclined portion (11a and 12a). When the door handle 1 is connected to the vehicle door 3, the second inclined portion (11a and 12a) becomes an inclined portion having a width in the vehicle width direction, which decreases from the front part 10 to the rear part 12. The second inclined portion (11a and 12a) rectifies an air flow so as to be directed toward a car body side. The second inclined portion (11a and 12a) may be formed in a straight line, or may be formed in a curved line. The first inclined portion 10a and the second inclined portion (11a and 12a) may be connected to each other, or a flat portion parallel to the front-and-rear direction may be sandwiched between the first inclined portion and the second inclined portion, instead of being connected to each other.

The door handle 1 has a ridge M1 connecting the front part 10 to the rear part 12 in the longitudinal direction. The ridge M1 is a straight line when seen from an upper surface (Z-axis direction). The ridge M1 is formed by the first inclined portion 10a and the second inclined portion (11a and 12a). More specifically, the ridge M1 extends from the front end 10c of the front part 10 to a rear end 12c of the rear part 12. The ridge M1 is formed at least by the second inclined portion (11a and 12a).

The door handle 1 has, in the rear part 12, an inflection portion 12g having a discontinuously changing height. For example, the inflection portion 12g changes the ridge M1 at the rear part 12. Accordingly, the rear end 12c of the door handle 1 has a severed shape. The shape of the ridge M1 and the shape of the inflection portion 12g of the rear part 12 improve a rectifying effect and an acceleration effect of the door handle 1.

The width of the door handle 1 (Y-axis direction) gradually increases from the front end 10c of the front part 10 to the rear of the front part 10 (inclination 10d). That is, a rear end 10f of the front part 10 protrudes to a longitudinal outside of the front end 10c along the connection surface 10b. In other words, a rear end 10f of the front part 10 protrudes in a width direction of the door handle 1 more than the front end 10c along the connection surface 10b. The width of the door handle 1 (Y-axis direction) is a maximum width W at a protruding portion 10e of the rear end 10f of the front part 10. The front end 10c may not be sharp.

The width of the door handle 1 (Y-axis direction) gradually decreases from a front end 12f of the rear part 12 to the rear of the rear part 12. That is, the rear end 12c of the rear part 12 is narrowed to a longitudinal inside of the front end 12f along the connection surface 12b. That is, the front end 12f of the rear part 12 may protrude to a longitudinal outside of the rear end 12c along the connection surface 12b. In other words, the front end 12f of the rear part 12 may protrude in a width direction of the door handle 1 more than the rear end 12c along the connection surface 12b. The width of a protruding portion 12e of the front end 12f of the rear part 12 is smaller than the width of the protruding portion 10e. Hereinafter, an inclination of in the rear part 12 in the width direction will be referred to as a third inclined portion 12d. When the door handle 1 is connected to the vehicle door 3, the third inclined portion 12d becomes an inclined portion having a width in the vehicle up-and-down direction, which decreases from the front part 10 to the rear part 12. The third inclined portion 12d increases a flow speed by converging an air flow. In the door handle 1 (Y-axis direction), the width of a side portion 11d of the grip part 11 is smaller than the maximum widths of the front part 10 and the rear part 12.

A cross section of the door handle 1 from the grip part 11 to the rear part 12 is a triangular shape or a bell shape. A gap to be formed between the grip part 11 and the vehicle door 3 is to be defined by an inner surface 11b of the grip part 11, an inner surface of the rear end 10f of the front part 10 (surface risen from the connection surface 10b), and an inner surface of the front end 12f of the rear part 12 (surface risen from the connection surface 12b). The width of the inner surface of the rear end 10f of the front part 10 may be the same as the width of the inner surface of the front end 12f of the rear part 12.

Figure 4A:
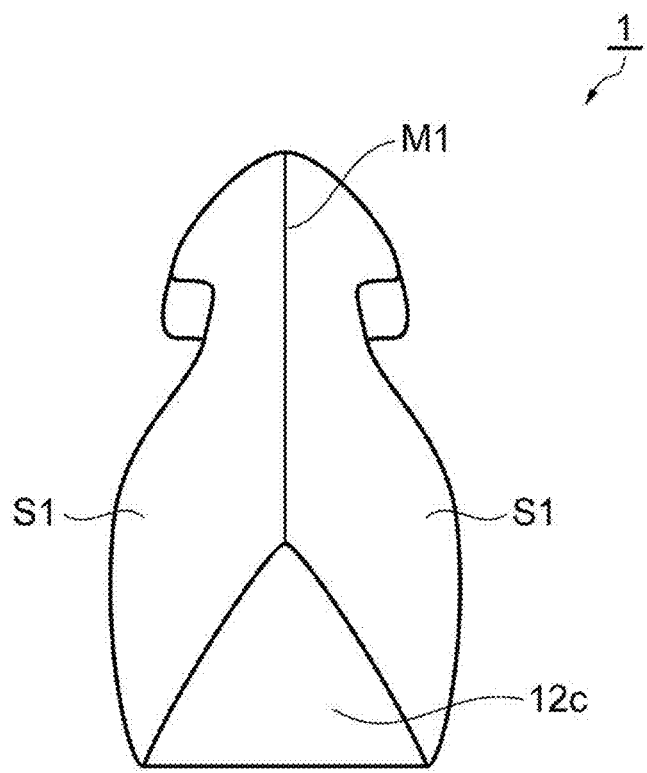
FIG. 4A is a perspective view of an example of the door handle seen from a rear surface.
Figure 4B:
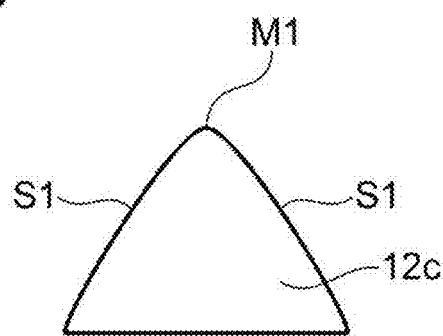
FIG. 4B is a rear view of an example of the door handle.

FIG. 4A is a perspective view of an example of the door handle seen from a rear surface. FIG. 4B is a rear view of an example of the door handle. As illustrated in FIGS. 4A and 4B, both side surfaces S1 configuring the ridge M1 may be flat surfaces. The more the both side surfaces are close to flat surfaces, the more a rectifying effect increases. When seen in the longitudinal direction, the ridge M1 is not angular, and is chamfered (so-called R-shape). The degree that the ridge M1 is chamfered along the longitudinal direction may be changed. For example, the front part 10 and the grip part 11 may be chamfered so as to approach a corner toward the rear when seen in the longitudinal direction.

Figure 5A:
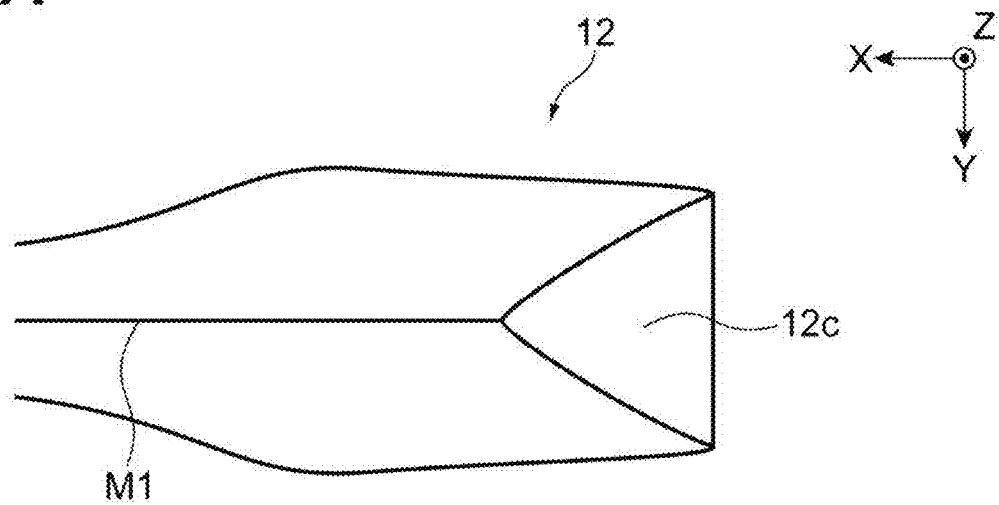
FIG. 5A is a top view of an example of a rear part of the door handle.
Figure 5B:
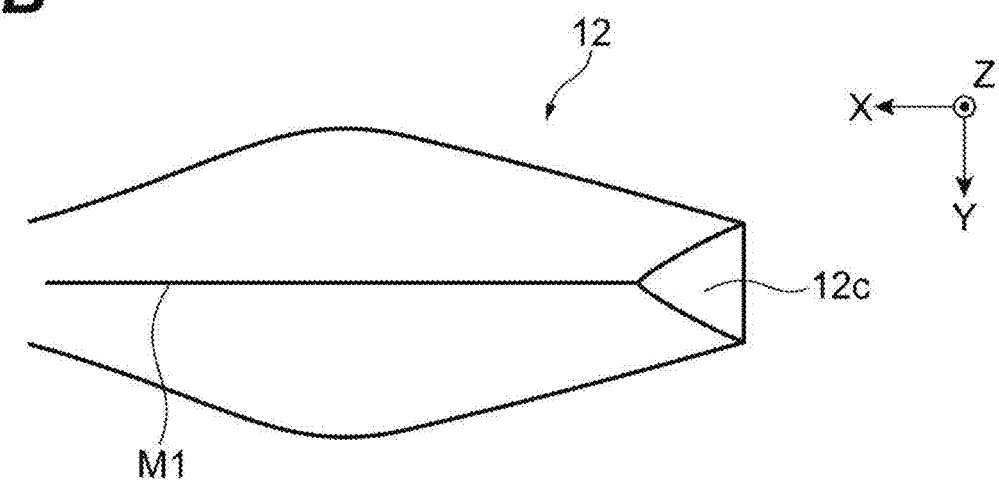
FIG. 5B is a top view of another example of a rear part of the door handle.
Figure 5C:
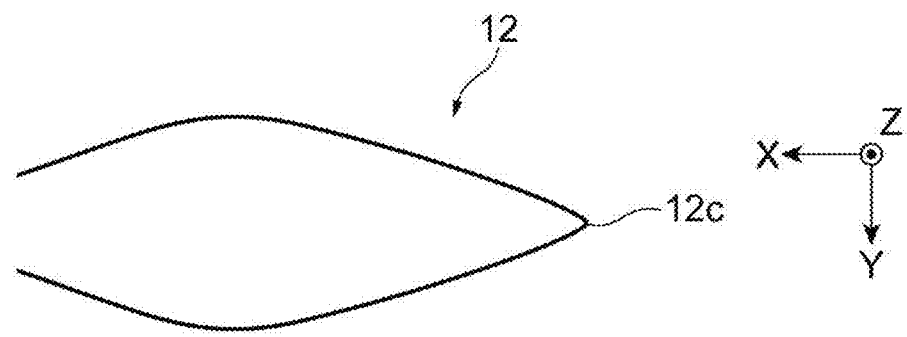
FIG. 5C is a top view of still another example of a rear part of the door handle.

FIG. 5A is a top view of an example of the rear part of the door handle. FIG. 5B is a top view of another example of a rear part of the door handle. FIG. 5C is a top view of still another example of a rear part of the door handle. As illustrated in FIGS. 5A to 5C, various shapes can be adopted as the shape of the rear part 12. FIGS. 5A and 5B are examples of the rear end 12c having a severed shape. FIG. 5C is an example of the rear end 12c having a shape of which a part is not cut off.

For example, the door handle 1 may be formed in the following dimensions.

As illustrated in FIG. 3B, when the length of the door handle 1 in the longitudinal direction is set as L0 and the length of the front part 10 in the longitudinal direction is set as L1, the door handle 1 satisfies, for example, L1/L0=0.27 to 0.35. As illustrated in FIG. 3C, when the maximum width in a direction orthogonal to the longitudinal direction is set as W, the door handle 1 satisfies, for example, W/L0=0.14 to 0.17.

As illustrated in FIG. 3B, when the maximum height is set as H and the height of the inflection portion 12g is set as h, a height difference (H−h) in the door handle 1 is, for example, within 5 mm. The height difference may be, for example, 1 mm.

On the connection surface 10b of the front part 10 illustrated in FIG. 3D, the curvature radius of the protruding portion 10e of the rear end 10f of the front part 10 is R4 or less. On the connection surface 12b of the rear part 12 illustrated in FIG. 3D, the curvature radius of the protruding portion 12e of the front end 12f of the rear part 12 is R5 or more. The curvature radius of an outline of the front end 12f of the rear part 12 illustrated in FIG. 3D is R25 or more.

Figure 6A:
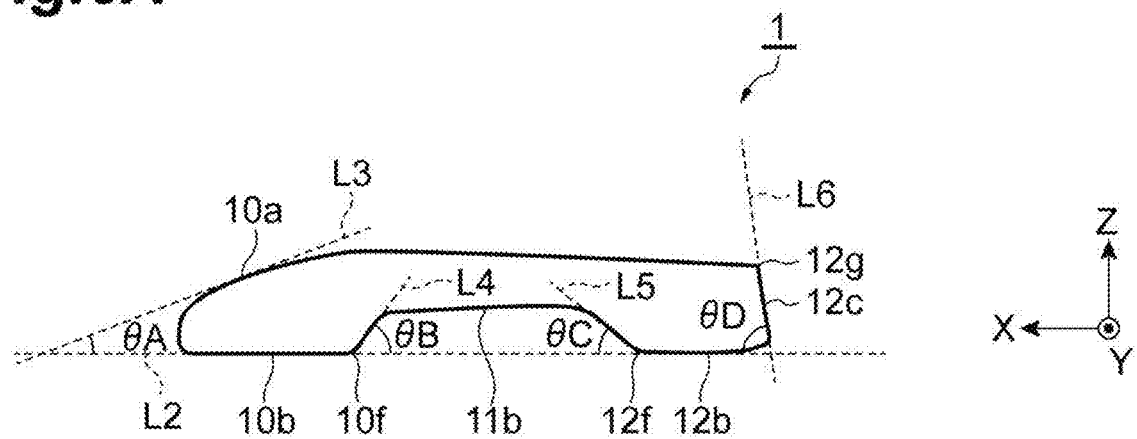
FIG. 6A is a side view of an example of the door handle for illustrating an angle related to the door handle.

FIG. 6A is a side view of an example of the door handle for illustrating an angle related to the door handle. The inclination angle of the first inclined portion 10a of the door handle 1 (front end angle) is set as OA. The front end angle θA is an angle formed between a reference line L2 parallel to the connection surface and a tangential line L3 of the first inclined portion 10a. The front end angle θA of the door handle 1 is, for example, 60° or less.

An angle at which the inner surface (surface risen from the connection surface 10b) of the rear end 10f of the front part 10 rises (front inner surface angle) is set as θB. The front inner surface angle θB is an angle formed between the reference line L2 and a tangential line L4 of the inner surface of the rear end 10f of the front part 10. The front inner surface angle θB of the door handle 1 is, for example, 60° or more and 90° or less.

An angle at which the inner surface (surface risen from the connection surface 12b) of the front end 12f of the rear part 12 rises (rear inner surface angle) is set as ° C. The rear inner surface angle θC is an angle formed between the reference line L2 and a tangential line L5 of the inner surface of the front end 12f of the rear part 12. The rear inner surface angle θC of the door handle 1 is, for example, 40° or more and 90° or less.

Figure 6B:
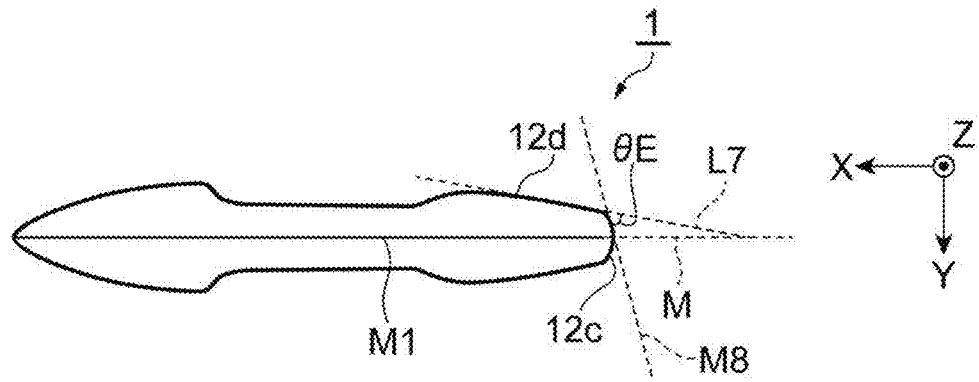
FIG. 6B is a top view of an example of the door handle for illustrating the angle related to the door handle.

An angle at which the rear end 12c (surface risen from the connection surface 12b) of the rear part 12 rises (rear outer surface angle) is set as θD. The rear outer surface angle θD is an angle formed between the reference line L2 and a tangential line L6 of the rear end 12c of the rear part 12. FIG. 6B is a top view of an example of the door handle for illustrating an angle related to the door handle. An opening angle, which is an angle formed between a direction along the narrowed external shape of the rear part 12 and a direction along the external shape of the rear end 12c of the rear part 12 on the connection surface of the rear part 12, is set as θE. The opening angle θE is an angle formed between a tangential line L7 of the narrowed external shape of the rear part 12 on the connection surface of the rear part 12 and a tangential line L8 of the external shape of the rear end 12c of the rear part 12 on the connection surface of the rear part 12. At least one of the rear outer surface angle θD and the opening angle θE of the door handle 1 is, for example, 60° or more. The central axis of the door handle 1 is indicated with M.

Figure 6C:
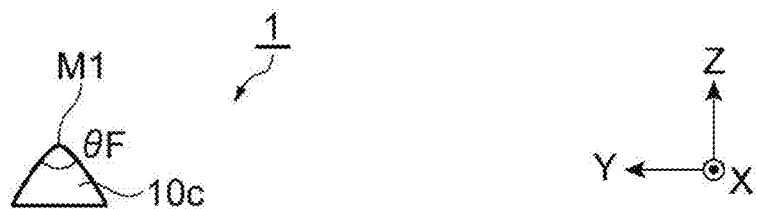
FIG. 6C is a rear view of an example of the door handle for illustrating the angle related to the door handle.

FIG. 6C is a rear view of an example of the door handle for illustrating an angle related to the door handle. The angle of the ridge M1 of the door handle 1 (setting angle) is set as OF. The setting angle θF is an angle formed between both side surfaces configuring the ridge M1. The setting angle θF of the door handle 1 is, for example, 60° or more and 160° or less.

(Mounting Location of Door Handle)

As illustrated in FIG. 1, the vehicle door 3 has the recessed portion 3a at a mounting location of the door handle 1. The recessed portion 3a opposes the door handle 1 that is in a state where an axis thereof is aligned with the vehicle front-and-rear direction. The width of the recessed portion 3a in the vehicle up-and-down direction is larger than the width of the door handle 1 in the vehicle up-and-down direction. A center line of the recessed portion 3a, which extends in the vehicle front-and-rear direction, matches the axis of the door handle 1. As a more specific example, the center line of the recessed portion 3a, which extends in the vehicle front-and-rear direction, penetrates through a center of the rear end 10f of the front part 10 of the door handle 1 in the vehicle up-and-down direction and a center of the front end 12f of the rear part 12 of the door handle 1 in the vehicle up-and-down direction.

FIG. 7 is a schematic view illustrating a relationship between the door handle and the door of the vehicle. As illustrated in FIG. 7, the position of the rear end 10f of the front part 10 of the door handle 1 matches the position of a front end 3b of the recessed portion 3a in the vehicle front-and-rear direction. The position of the front end 12f of the rear part 12 of the door handle 1 matches the position of a rear end 3c of the recessed portion 3a in the vehicle front-and-rear direction. A distance between the position of the rear end of the front part 10 of the door handle 1 and the position of the front end 3b of the recessed portion 3a may be within 4 mm in the vehicle up-and-down direction. In addition, the position of the front end 12f of the rear part 12 of the door handle 1 may be within 4 mm of the position of the rear end 3c of the recessed portion 3a in the vehicle up-and-down direction.

(Effect of Door Handle)

Since the curvature radius of the protruding portion 10e of the rear end 10f of the front part 10 of the door handle 1 is R4 or less, the protruding portion 10e of the door handle 1 can separate an air flow occurred along the outer surface of the front part 10. FIG. 8 is a schematic view illustrating a flow of an air flow in the vicinity of the door handle. When the protruding portion 10e of the rear end of the front part 10 of the door handle 1 is R4 or less, as illustrated in FIG. 8, an air flow W1 occurred during traveling is separated by the protruding portion 10e and is unlikely to enter the inside of the grip part 11. For this reason, the door handle 1 can prevent the occurrence of a turbulent flow. Consequently, the door handle 1 can improve the stability of the car body.

Since an angle at which the rear end 10f of the front part 10 rises is 60° or more (in other words, a rising angle of the rear end 10f of the front part 10 is 60° or more), the rear end 10f of the door handle 1 can separate an air flow occurred along the outer surface of the front part 10. When the rising angle of the rear end 10f of the front part 10 is 60° or more, as illustrated in FIG. 8, the air flow W1 occurred during traveling is separated by the rear end 10f of the front part 10 and is unlikely to enter the inside of the grip part 11. For this reason, the door handle 1 can prevent the occurrence of a turbulent flow. Consequently, the door handle 1 can improve the stability of the car body.

Since the curvature radius of the protruding portion 12e of the front end 12f of the rear part 12 is R5 or more, the protruding portion 12e of the door handle 1 does not separate the air flow that has entered the inside of the grip part 11. When the curvature radius of the protruding portion 12e of the front end 12f of the rear part 12 is R5 or more, as illustrated in FIG. 8, an air flow W2 that has entered the inside of the grip part 11 is likely to flow to the rear of the grip part as an air flow W3 instead of being separated by the protruding portion 12e of the rear part 12. For this reason, the door handle 1 can prevent the occurrence of a turbulent flow.

Since an angle at which the front end 12f of the rear part 12 rises is 90° or less (in other words, since a rising angle of the front end 12f of the rear part 12 is 90° or less), the front end 12f of the rear part 12 of the door handle 1 does not separate an air flow that has entered the inside of the grip part 11. When the rising angle of the front end 12f of the rear part 12 is 90° or less, as illustrated in FIG. 8, the air flow W2 that has entered the inside of the grip part 11 is likely to flow to the rear of the grip part as the air flow W3 instead of being separated by the front end 12f of the rear part 12. For this reason, the door handle can prevent the occurrence of a turbulent flow. Since a separation point of the air flow W3 flowing to the other side (an upper side and a lower side in the vehicle up-and-down direction) of the rear part 12 can be caused to match a separation point of an air flow W4 flowing above the rear part 12 (outside in the vehicle width direction) at the rear of the rear part 12, the occurrence of wrapping of an air flow can be prevented.

Since the curvature radius of the outline of the front end 12f of the rear part 12 of the door handle 1 is R25 or more, the air flow W3 is likely to flow to the rear of the grip part. By keeping the height difference (H–h) in the door handle 1 within 5 mm as illustrated in FIG. 3B, the door handle 1 can prevent an air flow occurred along the door handle 1 from being separated from a surface of the door handle 1 (FIG. 3B).

The door handle 1 is to be connected to the vehicle door 3 such that the position of the rear end 10f of the front part 10 matches the position of the front end 3b of the recessed portion 3a of the vehicle door 3 in the vehicle front-and-rear direction, and is to be connected to the vehicle door 3 such that the position of the front end 12f of the rear part 12 matches the position of the rear end 3c of the recessed portion 3a in the vehicle front-and-rear direction. The recessed portion 3a reduces a wall surface resistance of an air flow in the vicinity of the door handle 1. Accordingly, the flow speed of the air flow along a car body surface can be increased. The wall surface resistance of the air flow in the vicinity of the door handle 1 can be further reduced by matching a connecting portion of the door handle 1 and a connecting portion of the vehicle. That is, an air flow that has entered the inside of the grip part 11 is likely to flow to the rear of the grip part 11. For this reason, the door handle 1 can prevent the occurrence of a turbulent flow. A distance between the position of the rear end of the front part 10 of the door handle 1 and the position of the front end 3b of the recessed portion 3a may be within 4 mm in the vehicle up-and-down direction, or the position of the front end 12f of the rear part 12 of the door handle 1 may be within 4 mm of the position of the rear end 3c of the recessed portion 3a in the vehicle up-and-down direction. Even in this case, the occurrence of a turbulent flow can be prevented.

When the door handle 1 has received, from the front, a fluid having a predetermined flow speed, a rectified longitudinal vortex is generated at the rear of the rear end 12c of the door handle 1, and a flow speed at the rear is higher than the received flow speed since the rear end 12c of the rear part 12 of the door handle 1 has a severed shape. In addition, the flow of the fluid is pulled to the door handle 1, a flow speed at a position nearest to the door handle 1 is higher than the received flow speed. For this reason, when the rear end 12c has a severed shape, a rectifying effect increases compared to when the rear end 12c does not have a severed shape. In addition, the area of the rear end 12c illustrated in FIG. 5A (area of a triangular portion, which is a portion of which a part is cut off) is larger than the area of the rear end 12c illustrated in FIG. 5B. As the area of the rear end 12c increases, the rectifying effect described above increases. In addition, the door handle 1 can prevent an air flow along the outer surface of the car body at the rear of the grip part 11 from being separated since at least one of the rear outer surface angle θD and the opening angle θE is 60° or more. Consequently, the door handle 1 can prevent the occurrence of a turbulent flow.

The door handle 1 has the first inclined portion 10a, the second inclined portion (11a and 12a), the third inclined portion 12d, and the ridge M1, and the inflection portion 12g, which has a steeply rising shape with respect to a vehicle side surface in plan view of the vehicle, is set in the rear part 12. Therefore, an air flow in the vicinity of the door handle 1 is rectified and a flow speed thereof increases. Specifically, the first inclined portion 10a smoothly guides an air flow so as to be directed along the door handle 1. Specifically, the second inclined portion (11a and 12a) smoothly guides an air flow so as to be directed along the door handle 1. The second inclined portion (11a and 12a) can rectify the air flow so as to be directed toward the car body side. The third inclined portion 12d can increase a flow speed by converging the air flow. As a result, a main flow (the fastest flow of air flows) of the door handle 1 approaches the vehicle door 3, and the air flow is prevented from being separated away from the vehicle door 3. For this reason, the door handle 1 can prevent the occurrence of a turbulent flow.

Since the angle of the ridge M1 is 60° or more and 160° or less, the door handle 1 can further rectify an air flow in the vicinity of the door handle 1. For this reason, the door handle 1 can further prevent the occurrence of a turbulent flow.

Since the door handle 1 has a bilaterally symmetrical shape and the central axis M is to be disposed along the vehicle front-and-rear direction, the door handle is bilaterally symmetrical with respect to an air flow. For this reason, the flow speeds of air flows passing through the right and left (the upper side and the lower side in the vehicle up-and-down direction) of the grip part 11 can be made the same. In addition, the recessed portion 3a and the door handle 1 are disposed such that respective axes match. For this reason, the turbulence of an air flow, which is to occur by a difference between the flow speeds of air flows flowing in the right and left of the grip part 11, is prevented, and an air flow, of which a flow speed increases in front of the grip part 11 and which is to be directed to flow along the car body, is unlikely to enter the inside of the grip part 11 (the front end 12f of the rear part 12). Consequently, the door handle 1 can prevent the occurrence of a turbulent flow.

The embodiment described above can be implemented in various forms, in which various changes and improvements are made, based on knowledge of those skilled in the art.

EXAMPLE

In order to find out effects of the door handle of the disclosure, an example implemented by an inventor will be described.

(Door Handles of Example and Comparative Example)

In the example, the door handle 1 illustrated in FIGS. 3A to 3E was used. In a comparative example, a general door handle, which includes a front part, a grip part, and a rear part and has a smooth and continuous shape from a front end of the front part to a rear end of the rear part, was used. The following shows dimensions in the example and the comparative example.

Example 1

Length in longitudinal direction (L0): 250 mm
Length of front part in width direction (W): 52 mm
Length of grip part in width direction: 30 mm
Length of rear part in width direction: 43 mm
Height (H): 30 mm
Front inner surface angle ($\theta$B): 60°
Rear inner surface angle ($\theta$C): 40°
Rear outer surface angle ($\theta$D): 90°
Opening angle ($\theta$E): 90°
Setting angle ($\theta$F): 90°
Curvature radius of protruding portion of rear end of front part: R2
Curvature radius of protruding portion of front end of rear part: R25

Comparative Example 1

Length in longitudinal direction (L0): 257 mm
Length of front part in width direction (W): 48 mm
Length of grip part in width direction: 33 mm
Length of rear part in width direction: 53 mm
Height (H): 30 mm
Front inner surface angle ($\theta$B): 57°
Rear inner surface angle ($\theta$C): 64°
Rear outer surface angle ($\theta$D): 33°
Opening angle ($\theta$E): —
Setting angle ($\theta$F): —
Curvature radius of protruding portion of rear end of front part: R8
Curvature radius of protruding portion of front end of rear part: R10

(Rectifying Effect)

In Example 1 and Comparative Example 1, the pressure distribution of an air flow and the turbulence of an air flow were simulated. Results are shown in FIGS. 9A and 9B and FIGS. 10A and 10B.

Figure 9A:
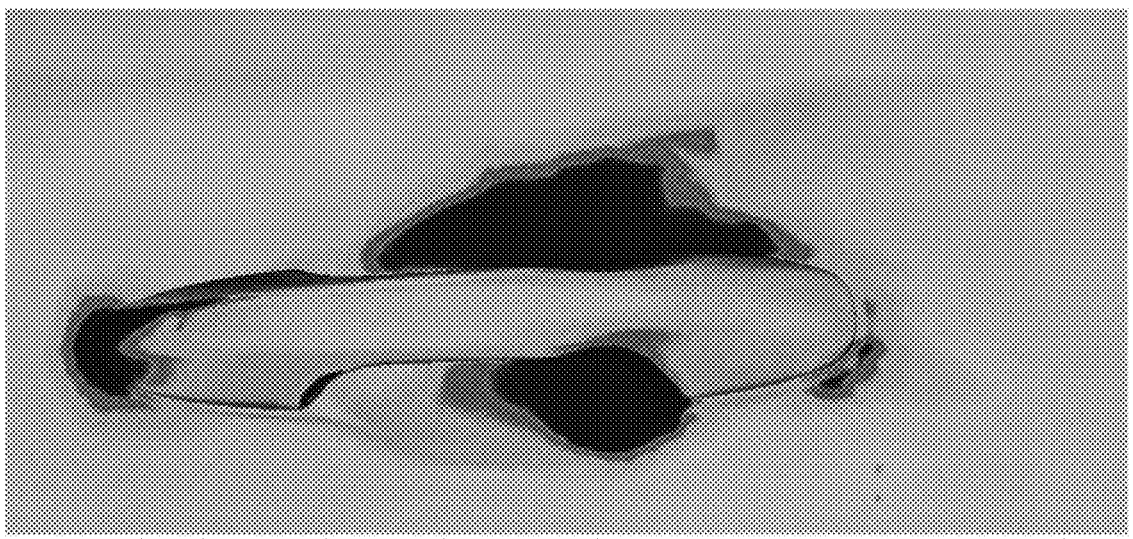
FIG. 9A is a simulation result of pressure distribution over a door handle according to a comparative example.
Figure 9B:
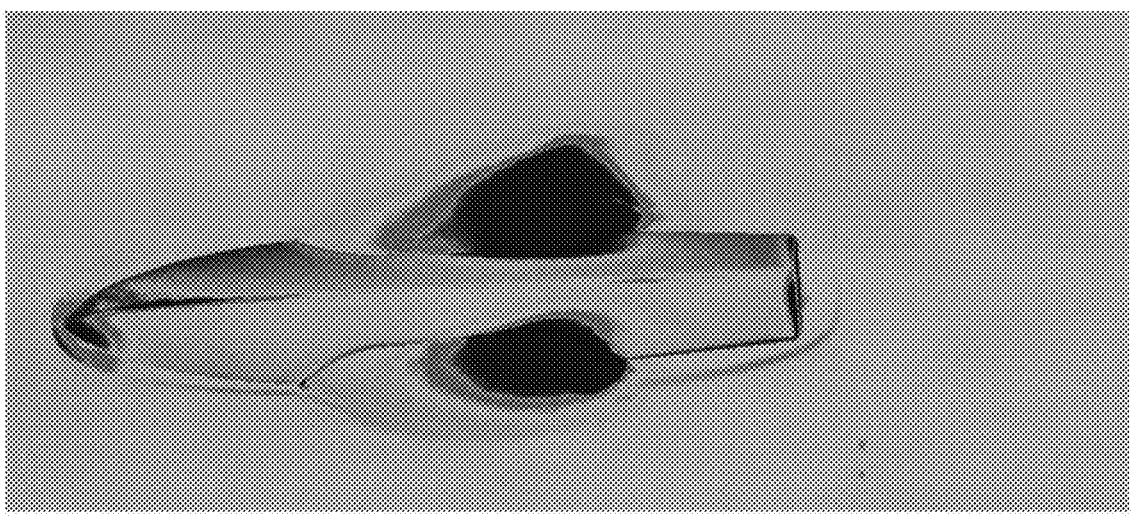
FIG. 9B is a simulation result of pressure distribution over a door handle according to an example.

FIG. 9A is a simulation result of pressure distribution over the door handle according to the comparative example. FIG. 9B is a simulation result of pressure distribution over the door handle according to the example. In FIGS. 9A and 9B, pressure distribution over the door handle that was in a state of being mounted on the recessed portion 3a of the vehicle door 3 was simulated. The dimensions of the recessed portion 3a were 113 mm in length, 105 mm in width, and 20 mm in depth. The color depth in FIGS. 9A and 9B means the level of a pressure. A deeper color means a higher pressure.

As illustrated in FIGS. 9A and 9B, a pressure at the front end of the front part decreased, and a pressure at the inside of the grip part 11 (recessed portion 3a) decreased in the door handle according to Example 1, compared to the door handle according to Comparative Example 1. As described above, it was found that the door handle of Example 1 that was in a state of being mounted on the recessed portion 3a of the vehicle door 3 improved pressure distribution over the inside of the grip part 11 so as to be uniform.

Figure 10A:
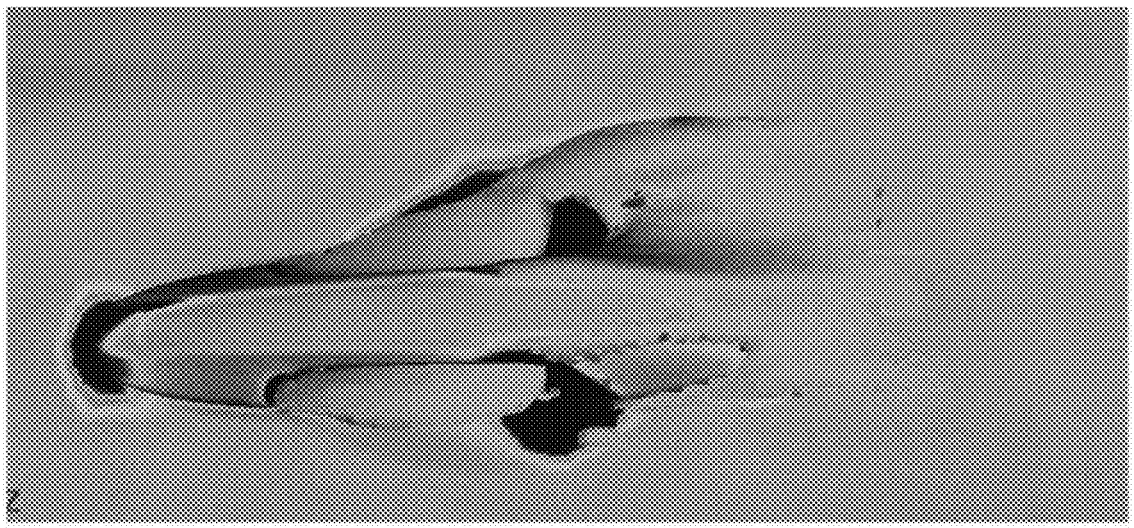
FIG. 10A is a simulation result of turbulence of an air flow of the door handle according to the comparative example.
Figure 10B:
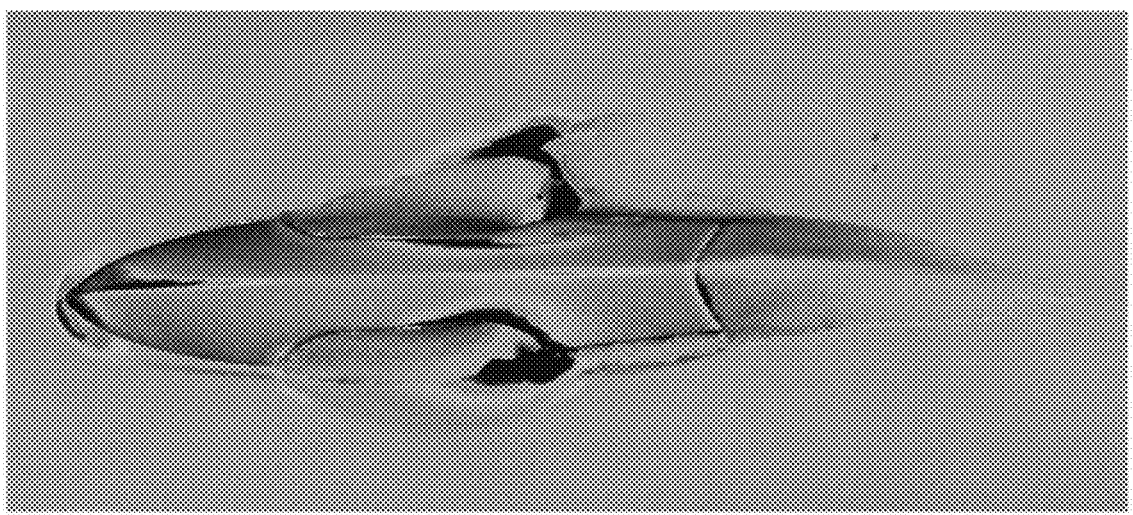
FIG. 10B is a simulation result of turbulence of an air flow of the door handle according to the example.

FIG. 10A is a simulation result of the turbulence of an air flow of the door handle according to Comparative Example 1. FIG. 10B is a simulation result of the turbulence of an air flow of the door handle according to Example 1. In FIGS. 10A and 10B, the turbulence of an air flow in the door handle that was in a state of being mounted on the recessed portion 3a of the vehicle door 3 was simulated. The dimensions of the recessed portion 3a were 113 mm in length, 105 mm in width, and 20 mm in depth.

As illustrated in FIG. 10A, it was found that an air flow was separated from the door handle according to Comparative Example 1. As for the door handle according to Comparative Example 1, it was found that the turbulence of the air flow increased at the rear of the door handle. As for the door handle according to Example 1, it was found that an air flow was not separated from the door handle according to Comparative Example 1 as illustrated in FIG. 10B. It was found that the turbulence of the air flow was weak, a longitudinal vortex was generated at the rear of the rear end 12c having a severed shape at the rear of the door handle, and an air flow close to a body surface was prevented from being separated in the door handle according to Example 1 compared to the door handle according to Comparative Example 1.

By simulating the pressure distribution of an air flow and the turbulence of an air flow as described above, it was found that the door handle of Example 1 has a rectifying effect and can prevent an air flow from entering the inside of the grip part 11 during traveling and a turbulent flow from occurring. Consequently, it was found that the door handle of Example 1 can improve the stability of the car body.

(Acceleration Effect)

The flow speed of the entire vehicle was simulated by using the door handles according to Example 1 and Comparative Example 1. As a result, it was found that a flow speed at the rear of the door handle was high in the door handle according to Example 1 compared to the door handle according to Comparative Example 1. That is, it was found that the door handle according to Example 1 has an acceleration effect.

(Findings on Effect by Difference in Body Shape)

The body shape means, for example, a sedan, a minivan, and the like. The door handle according to Example 1 was mounted onto four body shapes including a shape A to a shape D to find out that a difference in the body shape has an effect on evaluation results of the stability of the car body. The dimensions of the recessed portion 3a of the vehicle door 3 were 113 mm in length, 105 mm in width, and 20 mm in depth. Function evaluation, in which straight line stability, yaw responsiveness, and steering responsiveness are items to be assessed, was performed to evaluate the stability of the car body. With the stability of the car body when the body shape is the shape A as reference, the stability of the car body when the body shape is the shape B, the shape C, or the shape D is shown. Results are shown in FIG. 11A.

FIG. 11A shows results of verifying a relationship between a body shape and an effect of the door handle. As shown in FIG. 11A, the shape B to the shape D showed the same evaluation result as the shape A. That is, it was found that the door handle according to Example 1 has an effect of improving the stability of the car body regardless of a body shape.

(Findings on Effect by Difference in Shape and Mounting Condition of Door Handle)

Five conditions including a condition A to a condition E were set as shape and mounting conditions of the door handle, and the stability of the car body described above was evaluated for each condition. The condition A is a state when a handle shape is the same as the door handle according to Comparative Example 1, and the recessed portion 3a is not at a mounting position. This mounting position was set as a reference position. The condition B is a state when a handle shape is the same as the door handle according to Example 1, the recessed portion 3a is not at a mounting position, and a mounting position is the reference position. The condition C is a state when a handle shape is the same as the door handle according to Example 1, the recessed portion 3a is at the reference position, and a mounting position is a position 5 cm lower than the reference position in the vehicle up-and-down direction. The condition D is a state when a handle shape is the same as the door handle according to Example 1, the recessed portion 3a is at the reference position, and a mounting position is a position 5 cm higher than the reference position in the vehicle up-and-down direction. The dimensions of the recessed portion 3a were 113 mm in length, 105 mm in width, and 20 mm in depth. The condition E is a state when a handle shape is the same as the door handle according to Example 1, the recessed portion 3a is at the reference position, and a mounting position is the reference position. Evaluation results of the stability of the car body at the time of the condition B to the condition E are shown with an evaluation result of the stability of the car body when the shape and mounting conditions of the door handle correspond to the condition A as reference. Results are shown in FIG. 11B.

FIG. 11B shows results of verifying a relationship between a shape and mounting condition of the door handle and an effect of the door handle. As shown in FIG. 11B, with the condition A as reference, the condition B to the condition E showed better evaluation results in the stability of the car body. In addition, the condition E showed the best evaluation result out of the condition B to the condition E. When the condition A was compared with the condition B, it was found that an evaluation result of the stability of the car body became good by the door handle according to Comparative Example 1 being changed to the door handle according to Example 1. When the condition B was compared with the condition E, it was found that an evaluation result of the stability of the car body became good by the recessed portion 3a of the vehicle door 3 being present. In addition, when the condition C was compared with the condition E, it was found that an evaluation result of the stability of the car body became good by making a mounting position of the door handle the same height as the recessed portion 3a.

(Numerical Range of Front Timer Surface Angle θB)

A range of the front inner surface angle θB illustrated in FIG. 6A, in which an evaluation result of the stability of the car body improves, was found. Door handles with the front inner surface angles θB of 40°, 60°, 80°, 90°, and 100° were prepared, and the stability of each car body described above was evaluated. Other dimensions of the door handle were the same as in Example 1. Evaluation results of the stability of the car bodies when the front inner surface angles θB are 40°, 60°, 80°, 90°, and 100° are shown with an evaluation result of the stability of the car body having the door handle according to Comparative Example 1 as reference. Results are shown in FIG. 12A.

FIG. 12A shows results of verifying a relationship between the front inner surface angle θB and an effect of the door handle. As shown in FIG. 12A, an evaluation result of the stability of the car body having the door handle with the front inner surface angle θB of 40° is the same as an evaluation result of the stability of the car body having the door handle according to Comparative Example 1. Evaluation results of the stability of the car bodies having the door handles with the front inner surface angles θB of 60° and 80° are better than the evaluation result of the stability of the car body having the door handle according to Comparative Example 1. An evaluation result of the stability of the car body having the door handle with the front inner surface angle θB of 90° is better than the evaluation result of the stability of the car body having the door handle according to Comparative Example 1, and is better than the evaluation results of the stability of the car bodies having the door handles with the front inner surface angles θB of 60° and 80° (excellent). An evaluation result of the stability of the car body having the door handle with the front inner surface angle θB of 100° was the same as the evaluation result of the stability of the car body having the door handle according to Comparative Example 1.

Hereinbefore, it was found that the evaluation result of the stability of the car body improved when the front inner surface angle θB was 60° or more. In addition, it was found that the evaluation result of the stability of the car body improved most when the front inner surface angle θB was 90°. In this manner, results implying that an air flow is more likely to flow to the inner surface of the grip part as an inclination becomes gentler were found.

(Numerical Range of Rear Inner Surface Angle ° C.)

A range of the rear inner surface angle θC illustrated in FIG. 6A, in which an evaluation result of the stability of the car body improves, was found. Door handles with the rear inner surface angles ° C. of 40°, 60°, 80°, 90°, and 100° were prepared, and the stability of each car body described above was evaluated. Other dimensions of the door handle were the same as in Example 1. Evaluation results of the stability of the car body when the rear inner surface angles θC are 40°, 60°, 80°, 90°, and 100° are shown with an evaluation result of the stability of the car body having the door handle according to Comparative Example 1 as reference. Results are shown in FIG. 12B.

FIG. 12B shows results of verifying a relationship between the rear inner surface angle θC and an effect of the door handle. As shown in FIG. 12B, an evaluation result of the stability of the car body having the door handle with the rear inner surface angle θC of 100° is the same as an evaluation result of the stability of the car body having the door handle according to Comparative Example 1. Evaluation results of the stability of the car bodies having the door handles with the rear inner surface angles θC of 60°, 80°, and 90° are better than the evaluation result of the stability of the car body having the door handle according to Comparative Example 1. An evaluation result of the stability of the car body having the door handle with the rear inner surface angle θC of 40° is better than the evaluation result of the stability of the car body having the door handle according to Comparative Example 1, and is better than the evaluation results of the stability of the car bodies having the door handles with the rear inner surface angles θC of 60°, 80°, and 90° (excellent).

Hereinbefore, it was found that the evaluation result of the stability of the car body improved when the rear inner surface angle θC was 90° or less. In addition, it was found that the evaluation result of the stability of the car body improved most when the rear inner surface angle θC was 40°. In this manner, results implying that an air flow is more likely to escape as an inclination becomes gentler were found.

(Numerical Ranges of Rear Outer Surface Angle θD and Opening Angle θE)

Ranges of the rear outer surface angle θD and the opening angle θE illustrated in FIG. 6A, in which an evaluation result of the stability of the car body improves, were found. Door handles in which the rear outer surface angle θD and the opening angle θE are 45° to 90° were prepared, and the stability of each car body described above was evaluated. Other dimensions of the door handle were the same as in Example 1. Evaluation results of the stability of the car body having the door handle are shown with an evaluation result of the stability of the car body having the door handle according to Comparative Example 1 as reference. Results are shown in FIG. 13.

FIG. 13 shows results of verifying a relationship between the rear outer surface angle θD and the opening angle θE and an effect of the door handle. As shown in FIG. 13, an evaluation result of the stability of the car body having the door handle, in which (θD,θE)=) (45°,45° is satisfied, is the same as an evaluation result of the stability of the car body having the door handle according to Comparative Example 1. Evaluation results of the stability of the car bodies having the door handles, in which (θD,θE)=(45°, 60°), (60°, 60°), (75°, 45°), (75°, 60°), (90°, 45°), and (90°, 60°) are satisfied, are slightly better than the evaluation result of the stability of the car body having the door handle according to Comparative Example 1. Evaluation results of the stability of the car bodies having the door handles, in which (θD,θE)=) (45°,75°), (45°,90°), (60°,75°), (60°,90°), (75°,75°), and (75°,90°) are satisfied, are better than the evaluation result of the stability of the car body having the door handle according to Comparative Example 1. Evaluation results of the stability of the car body having the door handle, in which (θD,θE)=(90°,75°) and (90°,90°) are satisfied, are remarkably better than the evaluation result of the stability of the car body having the door handle according to Comparative Example 1 (excellent).

Hereinbefore, it was found that the evaluation result of the stability of the car body improved when at least one of the rear outer surface angle θD and the opening angle θE is 60° or more. In addition, it was found that the evaluation result of the stability of the car body improved most when (θD, θE)=(90°,75°) or (90°,90°) is satisfied.

(Numerical Range of Setting Angle ° F.)

A range of the setting angle θF illustrated in FIG. 6C, in which an evaluation result of the stability of the car body improves, was found. Door handles with the setting angles θF of 50° to 180° are prepared, and the stability of each car body described above was evaluated. Other dimensions of the door handle were the same as in Example 1. With an evaluation result of the stability of the car body having the door handle according to Comparative Example 1 as reference, evaluation results of the stability of the car body when the setting angle θF are 50° to 180° are shown. Results are shown in FIG. 14.

FIG. 14 shows results of verifying a relationship between the setting angle θF and an effect of the door handle. As shown in FIG. 14, an evaluation result of the stability of the car body having the door handles, with the setting angles θF of 50°, 170°, and 180°, is the same as an evaluation result of the stability of the car body having the door handle according to Comparative Example 1. Evaluation results of the stability of the car bodies having the door handles with the setting angles θF of 60°, 140°, 150°, and 160° are slightly better than the evaluation result of the stability of the car body having the door handle according to Comparative Example 1. Evaluation results of the stability of the car bodies having the door handles with the setting angles θF of 120° and 130° are better than the evaluation result of the stability of the car body having the door handle according to Comparative Example 1. Evaluation results of the stability of the car bodies having the door handles with the setting angles θF of 70°, 100°, and 110° are considerably better than the evaluation result of the stability of the car body having the door handle according to Comparative Example 1 (slightly excellent). Evaluation results of the stability of the car bodies having the door handles with the setting angles θF of 80° and 90° are remarkably better than the evaluation result of the stability of the car body having the door handle according to Comparative Example 1 (excellent).

Hereinbefore, it was found that the evaluation result of the stability of the car body improved when the setting angle θF was 60° or more and 160° or less. It was found that the evaluation result of the stability of the car body improved most when the setting angle θF is 80° or 90°.

(Verification of Positional Relationship between Door Handle and Recessed Portion)

The five conditions including the condition A to the condition E are set as the mounting positions of the door handle, and the stability of the car body described above was evaluated for each condition. The door handle has the following dimensions.

Comparative Example 2

Length in longitudinal direction (L0): 257 mm
Length of front part in width direction (W): 44 mm
Length of grip part in width direction: 33 mm
Length of rear part in width direction: 45 mm
Height (H): 23 mm
Front inner surface angle (θB): 57°
Rear inner surface angle (θC): 57°
Rear outer surface angle (θD): 90°
Opening angle (θE): —
Setting angle (θF): 120°
Curvature radius of protruding portion of rear end of front part:
R8
Curvature radius of protruding portion of front end of rear part:
R10

Figure 15A:
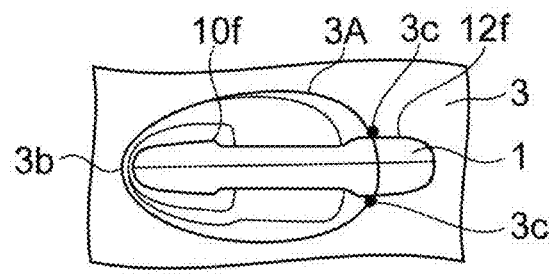
FIG. 15A is a top view of the door handle mounted in accordance with a mounting condition A.

FIG. 15A is a top view of the door handle mounted in accordance with the mounting condition A. At the time of the mounting condition A, a recessed portion 3A is provided in the vehicle door 3 and the door handle 1 is mounted on the recessed portion 3A. The dimensions of the recessed portion 3A of the vehicle door 3 are 185 mm in length, 115 mm in width, and 20 mm in depth. The front part of the door handle 1 is accommodated in the recessed portion 3A. That is, the rear end 10f of the front part of the door handle 1 does not match the front end 3b of the recessed portion 3A in the vehicle front-and-rear direction. The front end 12f of the rear part of the door handle 1 does not match the rear end 3c of the recessed portion 3A in the vehicle front-and-rear direction.

Figure 15B:
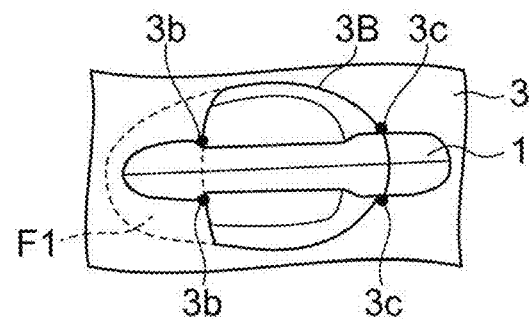
FIG. 15B is a top view of the door handle mounted in accordance with a mounting condition B.

FIG. 15B is a top view of the door handle mounted in accordance with the mounting condition B. At the time of the mounting condition B, a recessed portion 3B is provided in the vehicle door 3 and the door handle 1 is mounted on the recessed portion 3B. The recessed portion 3B is formed by filling a front region F1 of the recessed portion 3A. Accordingly, the rear end of the front part of the door handle 1 matches the front end 3b of the recessed portion 3B in the vehicle front-and-rear direction. The front end of the rear part of the door handle 1 does not match the rear end 3c of the recessed portion 3B in the vehicle front-and-rear direction.

Figure 15C:
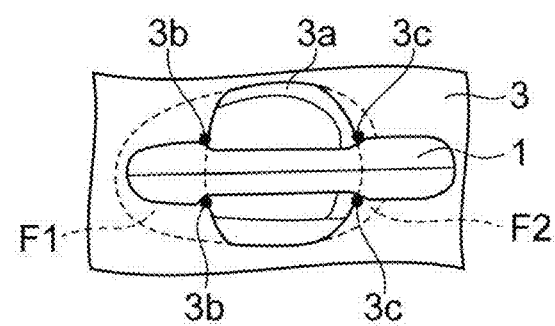
FIG. 15C is a top view of the door handle mounted in accordance with a mounting condition C.

FIG. 15C is a top view of the door handle mounted in accordance with the mounting condition C. At the time of the mounting condition C, the recessed portion 3a is provided in the vehicle door 3 and the door handle 1 is mounted on the recessed portion 3a. The recessed portion 3a is formed by filling the front region F1 and a rear region F2 of the recessed portion 3A. Accordingly, the rear end of the front part of the door handle 1 matches the front end 3b of the recessed portion 3a in the vehicle front-and-rear direction. In addition, the front end of the rear part of the door handle 1 matches the rear end 3c of the recessed portion 3a in the vehicle front-and-rear direction.

Figure 15D:
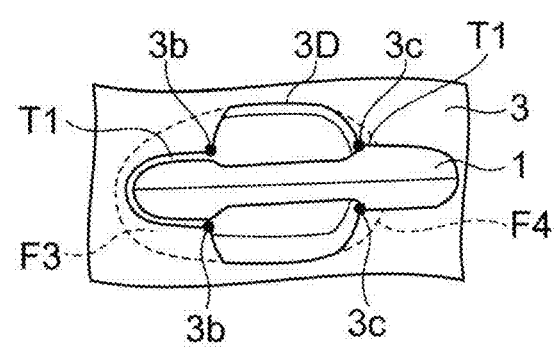
FIG. 15D is a top view of the door handle mounted in accordance with a mounting condition D.

FIG. 15D is a top view of the door handle mounted in accordance with the mounting condition D. At the time of the mounting condition D, a recessed portion 3D is provided in the vehicle door 3 and the door handle 1 is mounted on the recessed portion 3D. The recessed portion 3D is formed by filling a front region F3 and a rear region F4 of the recessed portion 3A. A gap T1 is respectively formed between the front region F3 and the door handle 1 and between the rear region F4 and the door handle 1. Accordingly, the rear end of the front part of the door handle 1 matches the front end 3b of the recessed portion 3D in the vehicle front-and-rear direction. The rear end of the front part of the door handle and the front end of the recessed portion are in a state of being spaced apart from each other by 4 mm in the vehicle up-and-down direction. In addition, the front end of the rear part of the door handle 1 matches the rear end 3c of the recessed portion 3D in the vehicle front-and-rear direction. The front end of the rear part of the door handle and the rear end of the recessed portion are in a state of being spaced apart from each other by 4 mm in the vehicle up-and-down direction.

Figure 15E:
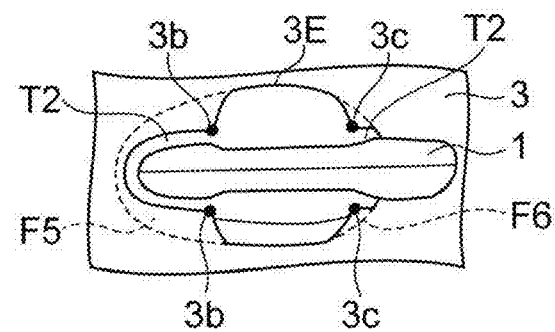
FIG. 15E is a top view of the door handle mounted in accordance with a mounting condition E.

FIG. 15E is a top view of the door handle mounted in accordance with the mounting condition E. At the time of the mounting condition E, a recessed portion 3E is provided in the vehicle door 3 and the door handle 1 is mounted on the recessed portion 3E. The recessed portion 3E is formed by filling a front region F5 and a rear region F6 of the recessed portion 3A. A gap T2 is respectively formed between the front region F5 and the door handle 1 and between the rear region F6 and the door handle 1. Accordingly, the rear end of the front part of the door handle 1 matches the front end 3b of the recessed portion 3E in the vehicle front-and-rear direction. The rear end of the front part of the door handle and the front end of the recessed portion are in a state of being spaced apart from each other by 6 mm in the vehicle up-and-down direction. In addition, the front end of the rear part of the door handle 1 matches the rear end 3c of the recessed portion 3E in the vehicle front-and-rear direction. The front end of the rear part of the door handle and the rear end of the recessed portion are in a state of being spaced apart from each other by 6 mm in the vehicle up-and-down direction.

The stability of the car body described above was evaluated for each of the five conditions described above including the condition A to the condition E. Evaluation results of the stability of the car body at the time of the mounting condition A to the mounting condition E are shown with an evaluation result of the stability of the car body having the door handle according to Comparative Example 1 as reference. Results are shown in FIG. 16A.

FIG. 16A shows results of verifying a relationship between a mounting condition and an effect of the door handle. As shown in FIG. 16A, an evaluation result of the stability of the car body having the door handle at the time of the mounting condition A is slightly worse than an evaluation result of the stability of the car body having the door handle according to Comparative Example 1. Evaluation results of the stability of the car bodies having the door handles at the time of the mounting conditions B and E are the same as the evaluation result of the stability of the car body having the door handle according to Comparative Example 1. An evaluation result of the stability of the car body having the door handle at the time of the mounting condition D is better than the evaluation result of the stability of the car body having the door handle according to Comparative Example 1. An evaluation result of the stability of the car body having the door handle at the time of the mounting condition C is remarkably better than the evaluation result of the stability of the car body having the door handle according to Comparative Example 1 (excellent).

As described above, it was found that an evaluation result of the stability of the car body improved by the rear end of the front part of the door handle 1 matching the front end 3b of the recessed portion 3A in the vehicle front-and-rear direction and by the front end of the rear part of the door handle 1 matching the rear end 3c of the recessed portion 3A in the vehicle front-and-rear direction. In addition, it was found that an evaluation result of the stability of the car body improved when a distance between the rear end of the front part of the door handle 1 and the front end 3b of the recessed portion 3D is 4 mm or less and a distance between the front end of the rear part of the door handle 1 and the rear end 3c of the recessed portion 3D is 4 mm or less.

(Numerical Range of Curvature Radius of Protruding Portion of Front Part)

A range of the curvature radius of the protruding portion 10e of the front part 10 illustrated in FIG. 3D, in which an evaluation result of the stability of the car body improves, was found. Door handles in which the curvature radiuses of the protruding portions 10e are R0 to R5 are prepared, and the stability of each car body described above was evaluated. Other dimensions of the door handle were the same as in Example 1. Evaluation results of the stability of the car body when the curvature radiuses of the protruding portions 10e are R0 to R5 are shown with an evaluation result of the stability of the car body having the door handle according to Comparative Example 1 as reference. Results are shown in FIG. 16B.

FIG. 16B shows results of verifying a relationship between the curvature radius of the rear end of the front part and an effect of the door handle. As shown in FIG. 16B, an evaluation result of the stability of the car body having the door handle in which the curvature radius is R5 is the same as an evaluation result of the stability of the car body having the door handle according to Comparative Example 1. Evaluation results of the stability of the car bodies having the door handles in which the curvature radiuses are R3 and R4 are better than the evaluation result of the stability of the car body having the door handle according to Comparative Example 1. Evaluation results of the stability of the car bodies having the door handles in which the curvature radiuses are R0, R1, and R2 are remarkably better than the evaluation result of the stability of the car body having the door handle according to Comparative Example 1 (excellent).

Hereinbefore, it was found that the evaluation result of the stability of the car body improved when the curvature radius of the protruding portion 10e of the front part 10 was R4 or less.

(Numerical Range of Curvature Radius of Protruding Portion of Rear Part)

A range of the curvature radius of the protruding portion 12e of the rear part 12 illustrated in FIG. 3D, in which an evaluation result of the stability of the car body improves, was found. Door handles in which the curvature radiuses of the protruding portions 12e are R0 to R25 are prepared, and the stability of each car body described above was evaluated. Other dimensions of the door handle were the same as in Example 1. Evaluation results of the stability of the car body when the curvature radiuses of the protruding portions 12e are R0 to R25 are shown with an evaluation result of the stability of the car body having the door handle according to Comparative Example 1 as reference. Results are shown in FIG. 16C.

FIG. 16C shows results of verifying a relationship between the curvature radius of the front end of the rear part and an effect of the door handle. As shown in FIG. 16C, an evaluation result of the stability of the car body having the door handle in which the curvature radius is R0 is the same as an evaluation result of the stability of the car body having the door handle according to Comparative Example 1. An evaluation result of the stability of the car body having the door handle in which the curvature radius is R4 is slightly better than the evaluation result of the stability of the car body having the door handle according to Comparative Example 1. An evaluation result of the stability of the car body having the door handle in which the curvature radius is R15 is better than the evaluation result of the stability of the car body having the door handle according to Comparative Example 1. Evaluation results of the stability of the car bodies having the door handles in which the curvature radiuses are R5 and R20 are considerably better than the evaluation result of the stability of the car body having the door handle according to Comparative Example 1 (slightly excellent). An evaluation result of the stability of the car body having the door handle in which the curvature radius is R25 is remarkably better than the evaluation result of the stability of the car body having the door handle according to Comparative Example 1 (excellent).

Hereinbefore, it was found that the evaluation result of the stability of the car body improved when the curvature radius of the protruding portion 12e of the rear part 12 was R5 or less.

What is claimed is:

1. A door handle that has an elongated shape and is mounted onto a vehicle door in a state where a longitudinal direction thereof is aligned with a vehicle front-and-rear direction, the door handle comprising:
   a front part and a rear part each of which has a connection surface to be connected to the vehicle door; and
   a grip part provided between the front part and the rear part,
   wherein a rear end of the front part protrudes in a width direction of the door handle more than a front end of the front part along the connection surface of the front part, and
   a curvature radius of a protruding portion of the rear end of the front part on the connection surface of the front part is R4 or less.

2. The door handle according to claim 1, wherein the rear end of the front part forms an inner surface of the grip part, and a rising angle of the rear end of the front part forming the inner surface of the grip part is 60° or more.

3. The door handle according to claim 1, wherein a front end of the rear part protrudes in a width direction of the door handle more than a rear end of the rear part along the connection surface of the rear part, and a curvature radius of a protruding portion of the front end of the rear part on the connection surface of the rear part is R5 or more.

4. The door handle according to claim 1, wherein a front end of the rear part forms an inner surface of the grip part, and a rising angle of the front end of the rear part forming the inner surface of the grip part is 90° or less.

5. The door handle according to claim 1, wherein the front part is connected to the vehicle door such that a position of the rear end thereof matches a position of a front end of a recessed portion, which opposes the grip part and is provided in a surface of the vehicle door, in the vehicle front-and-rear direction, and the rear part is connected to the vehicle door such that a position of a front end thereof matches a position of a rear end of the recessed portion in the vehicle front-and-rear direction.

6. The door handle according to claim 5, wherein the front part is connected to the vehicle door such that a distance between the position of the rear end thereof and the position of the front end of the recessed portion is within 4 mm in a vehicle up-and-down direction, and the rear part is connected to the vehicle door such that the position of the front end thereof is within 4 mm of the position of the rear end of the recessed portion in the vehicle up-and-down direction.

7. The door handle according to claim 1, wherein a rear end of the rear part is narrowed in a width direction more than a front end of the rear part along the connection surface of the rear part, the rear end has a severed shape, and at least one of an opening angle formed between a direction along a narrowed external shape of the rear part and a direction along an external shape of the rear end of the rear part on the connection surface of the rear part and an rising angle of the rear end of the rear part is 60° or more.

8. The door handle according to claim 1, further comprising:
   a first inclined portion that is formed in the front part and has a width in a vehicle width direction, which increases from the front part to the rear part;
   a second inclined portion that is formed at a rear of the first inclined portion in the vehicle front-and-rear direction and has a width in the vehicle width direction, which decreases from the front part to the rear part;
   a third inclined portion that has a width in the vehicle up-and-down direction, which decreases from the front part to the rear part; and
   a ridge connected the front part to the rear part,
   wherein an inflection portion which has a steeply rising shape with respect to a vehicle side surface in plan view of a vehicle is set in the rear part.

9. The door handle according to claim 8, wherein an angle of the ridge is 60° or more and 160° or less.

* * * * *